United States Patent [19]

Bennett

[11] Patent Number: 5,779,888
[45] Date of Patent: Jul. 14, 1998

[54] FILTERING APPARATUS

[75] Inventor: Peter Joseph Bennett, Katoomba, Australia

[73] Assignee: Baramy Engineering Pty. Ltd., Katoomba, Australia

[21] Appl. No.: 707,796

[22] Filed: Sep. 4, 1996

[30] Foreign Application Priority Data

Sep. 4, 1995 [AU] Australia .................................. PN5201

[51] Int. Cl.$^6$ .................................................. B01D 29/44
[52] U.S. Cl. ........................ 210/162; 210/170; 210/456
[58] Field of Search ............................. 210/154, 162, 210/170, 433.1, 434, 456, 499

[56] References Cited

U.S. PATENT DOCUMENTS

| | | | |
|---|---|---|---|
| 1,825,169 | 9/1931 | Wyckoff | 210/154 |
| 2,106,851 | 2/1938 | Nordell | 210/162 |
| 3,123,455 | 3/1964 | Paasche | 210/162 |
| 3,282,430 | 11/1966 | Kinne | 210/170 |
| 4,081,374 | 3/1978 | Forshee | 210/162 |
| 4,287,064 | 9/1981 | Ando | 210/413 |
| 4,801,377 | 1/1989 | Bolt | 210/162 |
| 5,141,650 | 8/1992 | Cavo et al. | 210/170 |
| 5,232,587 | 8/1993 | Hegemier et al. | 210/170 |
| 5,531,888 | 7/1996 | Geiger et al. | 210/162 |

FOREIGN PATENT DOCUMENTS

| | | |
|---|---|---|
| 26871 | 3/1924 | France . |
| 2743580 | 3/1979 | Germany . |
| 2267446 | 12/1993 | United Kingdom . |
| 9417896 | 8/1994 | WIPO . |

*Primary Examiner*—Christopher Upton
*Attorney, Agent, or Firm*—Ladas & Parry

[57] ABSTRACT

A filtering apparatus (1) to filter solid litter from stormwater. The apparatus (1) comprises an inclined filter grate (2) which is located above an outlet (4). The grate (2) extends downwardly from the inlet (3) so that litter is filtered from the stream by the grate 2, with the litter being directed towards a catchment surface (8).

16 Claims, 6 Drawing Sheets

FILTERING APPARATUS

FIELD OF THE INVENTION

This invention relates to pollution control and, in particular, to a filtering apparatus or pollutant trap adapted to extract litter from waterways.

BACKGROUND OF THE INVENTION

Most of the litter and other pollutants which enter rivers and oceans near townships or cities are washed into the waterways via stormwater drains and canal systems. This litter is not only harmful to marine life, but is ugly and can carry disease.

Conventionally, waterways, such as stormwater canals or drains, are cleared of litter by placing a coarse mesh filter perpendicularly across the flow of water. As the water flows through the filter, pieces of litter which are too large to pass between the bars accumulate on the upstream side of the filter. The accumulated litter sits in the water until the filter is cleaned, or the stormwater drain (or canal) dries up.

If the filter is made from a fine mesh, it may not allow a sufficient flow of water to pass through. This can lead to an accumulation of back pressure in conditions of high water flow, possibly resulting in flooding of the stormwater drain or canal. Using a coarse filter, with large spacing between the bars, allows a larger flow of water through the filter. However, a coarse filter allows more litter to flow through the filter, catching only the larger pieces of litter.

Additionally, these types of filters are difficult to maintain. Because the accumulated litter is either submerged in the flow of water (blocking its path), or floating on top of the water, it is usually necessary for a person to reach or climb into the drain to manually remove the litter. If the stormwater drain or canal dries up, it is still necessary for a person to enter the drain or canal to remove the accumulated litter.

In certain conditions, the accumulated litter which is floating in the water may rot, releasing poisonous substances into the water and breaking up into smaller pieces which can then be washed through the filter and into a river or ocean.

Another presently known system of removing rubbish from waterways is shown in FIG. 6. This system involves channelling the flow of water (30) into a cylindrical container (35). The water flows into a region enclosed by a curved perforated plate (32) within the container, where it forms a vortex (arrows 33). The litter is trapped within the perforated plate, allowing the water to flow through the plate and out via an outlet pipe (31). Litter falls into a basket (34) or holding area, which is submerged at the bottom of the unit.

The unit is emptied by lifting the basket up through the volume of water inside the perforated plate, where it catches any remaining floating debris. The basket is then emptied. This requires specially adapted heavy lifting equipment. Alternatively a vacuum pump unit sucks out the pollutant from the holding area. A further disadvantage of this system is that the rubbish collected by the unit remains submerged in water until the unit is emptied. Furthermore, inspection of the unit is difficult, as the litter collecting basket is submerged at the bottom of the unit, and needs to be lifted in order to inspect the level of litter inside it.

SUMMARY OF THE INVENTION

According to the invention there is provided a filtering apparatus for filtering solid litter from a flow of water, said apparatus comprising:

an inlet adapted to receive said flow of water;
an inclined filter grate for filtering said solid litter from said flow of water; and
an outlet to receive filtered water; and wherein
said inlet directs said flow of water onto an upper surface of said inclined filter grate in a direction substantially parallel to said filter.

Preferably said filter grate is generally planar.

Preferably, said apparatus further comprises catchment means located at a lower end of said inclined filter grate, said apparatus being adapted to retain the solid with said catchment means being adapted to collect the filtered litter from said inclined filter grate.

Preferably, said inlet is located at an upper end of said inclined filter grate.

If said filtering apparatus is for filtering stormwater, said inlet is adapted to be attached to a stormwater drain.

Ideally, said inclined filter grate is inclined at an angle of about 18°–25° to the horizontal and extends downwardly from said inlet.

Advantageously, said inclined filter grate comprises a plurality of spaced-apart parallel beams, each said beam having a generally flat upper surface, and each said beam being substantially parallel to the direction of said flow of water from said inlet.

Preferably, the spacing between adjacent beams is about 1.5 times the width of each beam.

Preferably, each said beam is substantially rectangular in cross-section or "T" or "V" profile.

Desirably, said outlet comprises a channel, a first section of said channel being located underneath said inclined filter grate.

Preferably, said inlet comprises:

an inlet aperture adapted to be connected to a stormwater drain, pipe or canal; and flow direction means to direct said flow of water onto said inclined filter grate in a direction substantially parallel to the filter grate.

Preferably, said flow direction means comprises a deflector plate located at a predetermined distance downstream from the inlet aperture, said deflector plate being adapted to direct said flow of water onto said inclined filter grate.

Preferably, said inlet further comprises a plate section located underneath said deflector plate, said plate section being inclined at the same angle as said inclined filter grate, and aligned with the upper end of said inclined filter grate to direct water onto said inclined filter grate in co-operation with the deflector plate.

Ideally, said deflector plate is inclined at an angle of about 10° to the vertical.

Conveniently, said catchment means comprises a catchment surface located at the lower end of said inclined filter grate, said catchment surface being inclined towards said inclined filter grate at an angle of about 1°.

Preferably, said outlet channel is inclined away from said apparatus at an angle of about 5°.

Advantageously, said catchment surface comprises an end wall and at least two sidewalls, wherein at least said sidewalls slope towards said catchment surface.

Preferably, said end wall comprises an overflow grate or weir adapted to release water from said apparatus when said apparatus is flooded to a predetermined level.

Conveniently, said end wall, said deflector plate, said catchment surface and/or said sidewalls are made from concrete or reinforced concrete.

Preferably, at least one of said sidewalls is adapted to function as an access ramp to provide vehicular or manual access to said catchment surface.

Preferably, said outlet comprises substantially U-shaped concrete channels, said outlet having a cross-sectional area greater than or equal to the area of the inlet aperture.

The invention also provides a method of filtering solid litter from a flow of water, said method comprising the steps of:

directing said flow of water, via an inlet, onto an upper surface of an inclined generally planar filter in a direction substantially parallel to the plane of said filter; and collecting and directing the filtered water away from said apparatus via an outlet.

A preferred embodiment of the present invention will now be described, by way of example only, with reference to the accompanying drawings.

PREFERRED EMBODIMENT OF THE INVENTION

Figure 1:
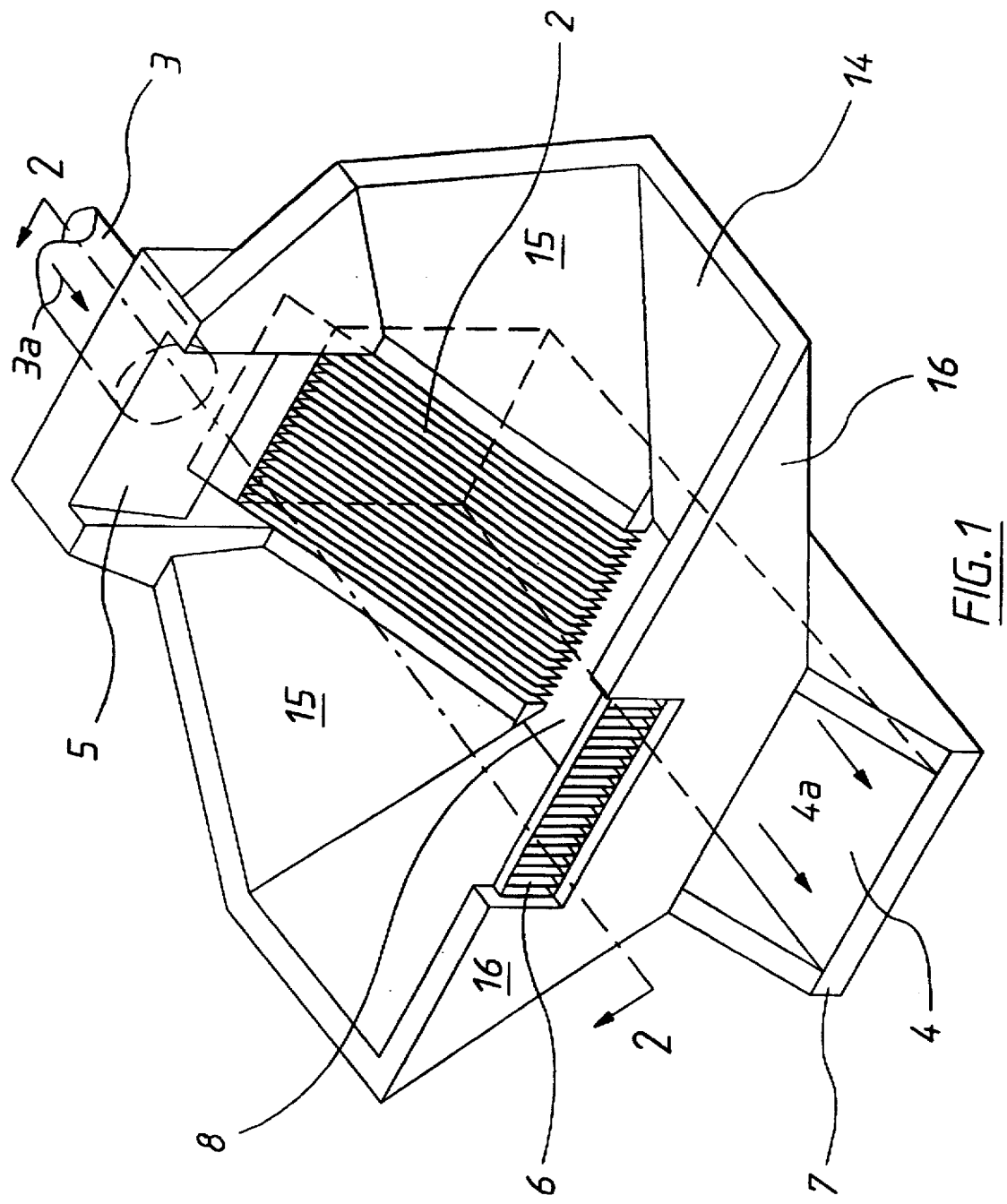
FIG. 1 is a perspective view of a pollutant trap.
Figure 2:
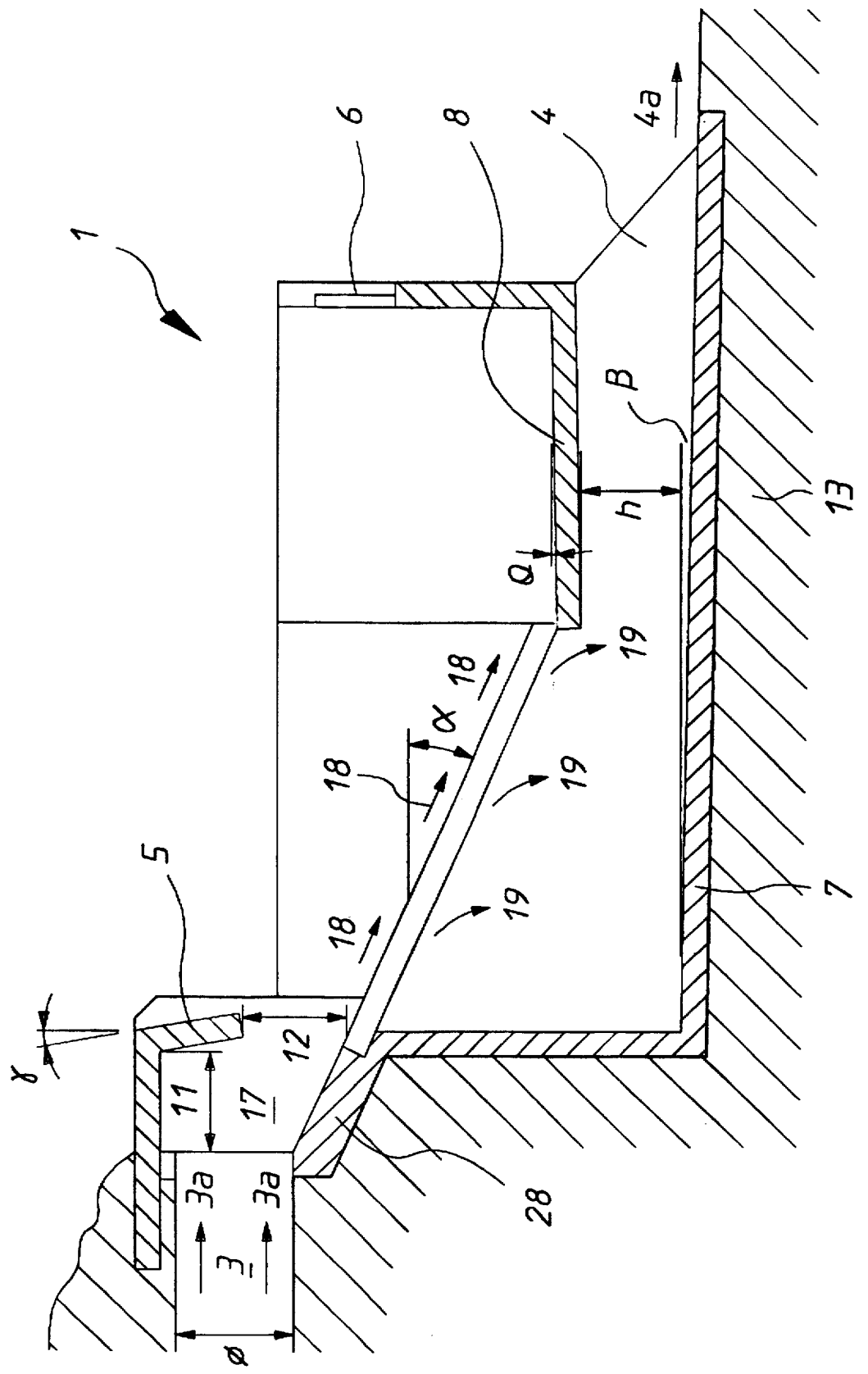
FIG. 2 is a cross-section of the pollutant trap of FIG. 1, taken through line 2—2 as shown in FIG. 1.

Referring to FIGS. 1 and 2, the filtering apparatus (1) comprises a sloping grate (2) which is located above a base (7). The grate (2) slopes down towards a catchment surface or collection platform (8). The grate (2) and the collection platform (8) are surrounded by walls (14,15 and 16). The grate (2) is constructed from a plurality of spaced apart beams (20), which are supported by one or more cross-members (21).

The filtering apparatus (1) can be installed in a stormwater channel, or in a section of stormwater drainpipe. However, the filtering apparatus is also suitable for filtering litter and/or solids from streams, or any situation in which water-borne litter is a problem.

In FIGS. 1 and 2, the stormwater (arrows 3a) is channelled into the filtering apparatus via an inlet pipe (3). The inlet pipe (3) may be part of an existing stormwater drain system, or can be supplied with the filtering apparatus (1) for attachment to a stormwater drainage system. The water enters the filtering apparatus at the inlet region (17).

A deflector plate (5) is provided in the inlet region (17) at a distance downstream from the end of the inlet pipe (3). The stormwater cascades from the inlet pipe (3), onto the sloping grate (2). The deflector plate (5) ensures that all the water flowing from the inlet pipe (3) is deflected down onto the sloping grate for separation. The deflector plate (5) is particularly useful in times of heavy rain, when the water may flow very quickly out of the inlet pipe (3) and be projected over and above the sloping grate (2). The deflector plate (5) and sloping grate (2) ensures that the water flows over the top of the grate in a direction substantially parallel to the grate. The deflector plate (5) spreads the water which flows from the pipe (3), and directs it onto the sloping inlet plate section (28), from where it is channelled down the sloping grate (2). For an inlet pipe (3) having a diameter $\phi$, it has been found that the deflector plate is most effective when placed a distance of at least $\phi$ downstream from the end of the pipe (3), and a height of approximately 0.8 $\phi$ above the top of the grate (2).

The water then flows down the sloping grate (2), towards the catchment surface (8). As it flows down the grate, the water is filtered by the closely spaced beams (20), and falls down (arrows 19) onto the base (7), where it flows away via the outlet (4), as shown by arrows (4a). The height (h) of the outlet (4) should be at least as large as the diameter ($\phi$) of the inlet pipe, to reduce the possibility of flooding. The sloping grate (2) preferably has a flat, smooth upper surface, and closely spaced beams (20). The slope of the grate and its smooth profile cause the water to flow downwards along the top surface of the grate until it falls between the grate beams (20). The flow of water is substantially parallel to the grate (2), rather than perpendicular. The litter filtered by the grate (2) is pushed downwards towards the catchment surface (8) by the flowing water (arrows 18). The smooth surface of the grate and its slope further assist to push the litter towards the catchment surface (8). The close-spaced relationship of the grate beams (20) also helps prevent pieces of litter from being caught between the beams (20).

The slope of the grate (2) with respect to the horizontal (angle $\alpha$) is preferably about 18°–25°. The catchment surface (8) on which the filtered litter accumulates, is also preferably sloped towards the grate (2), so that water can flow back into the grate (2) from the catchment surface (8). The slope of the catchment surface (angle $\theta$) is preferably about 1°. This arrangement ensures that the litter collected on the collection platform (8) remains essentially "dry". This means that there is less likelihood of the litter rotting or decomposing, which would further pollute the stormwater flowing through the filtering apparatus (1).

To assist the flow of water out of the filtering apparatus (1), the base (7) of the apparatus is preferably set at an incline of about 5% (angle $\beta$) which is a ratio of the fall relative to its distance between where the water enters and leaves the apparatus (1). The deflector plate (5) is preferably inclined at about 10° to the vertical (angle $\gamma$) so as to deflect the water downwards, but not block its flow excessively.

The filtering apparatus (1) is also preferably provided with an overflow grate or weir (6) to allow water to escape from the filtering apparatus in times of excessive flooding.

Referring to FIG. 1, the apparatus (1) is substantially surrounded by walls (14,15 and 16). At least some of the walls of the apparatus are sloped inwardly to allow rainwater etc. to run into the apparatus and be released with the outlet water (4a). One of the walls (14) also preferably serves as a ramped access section. The ramped access wall (14) allows a vehicle and/or maintenance crew to enter the trap for the removal of accumulated litter once the flow of water through the filtering apparatus has subsided.

As can be seen in FIG. 1, the litter accumulating on the surface (8) of the apparatus is visible, which means that a quick, visual inspection can determine whether the collection surface (8) requires cleaning. It is foreseen that the ramped wall (14) will allow a compact earthmoving or loading vehicle, such as a Bobcat (registered trademark) vehicle to enter the trap to remove the accumulated litter from the collection surface (8).

The end wall (16) and deflector plate (5) are preferably formed from reinforced concrete so as to withstand the constant pressure of flowing water. The sidewalls (14 and 15) are also preferably made from concrete. The whole assembly can be set into the earth (13), so that the top of the ramp wall (14) is level with the ground (13). This allows easy access to the collection surface (8) for the removal of accumulated litter.

When installed, the filtering apparatus (1) will preferably be surrounded by a fence, such as a swimming pool fence to prevent accidental or unauthorised access.

Figure 3:
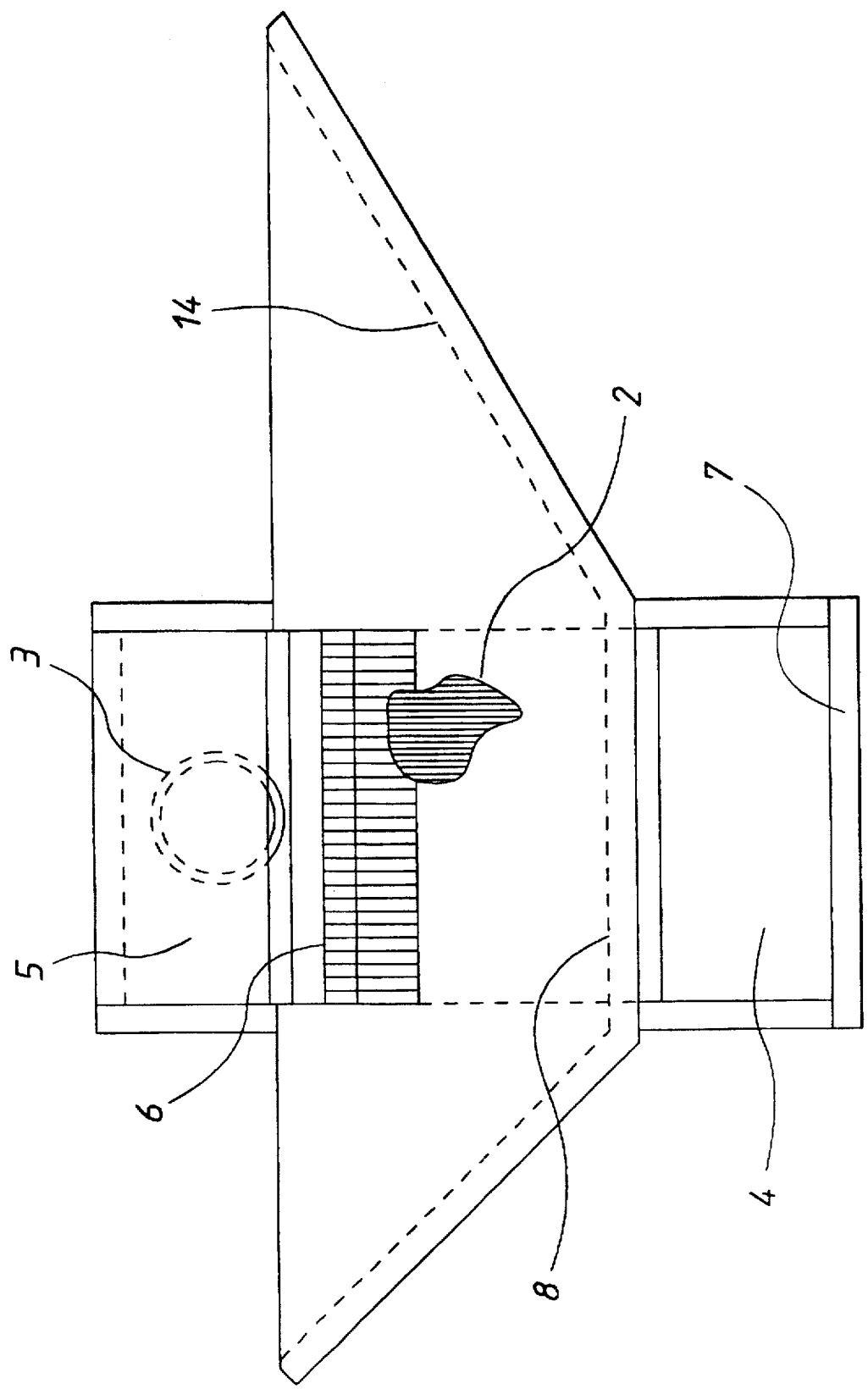
FIG. 3 is an end view of the pollutant trap of FIG. 1.
Figure 4A:
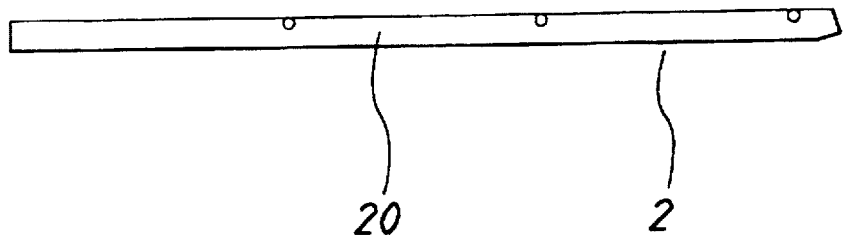
FIGS. 4a and 4b show a side and top view of a grate respectively.
Figure 4B:
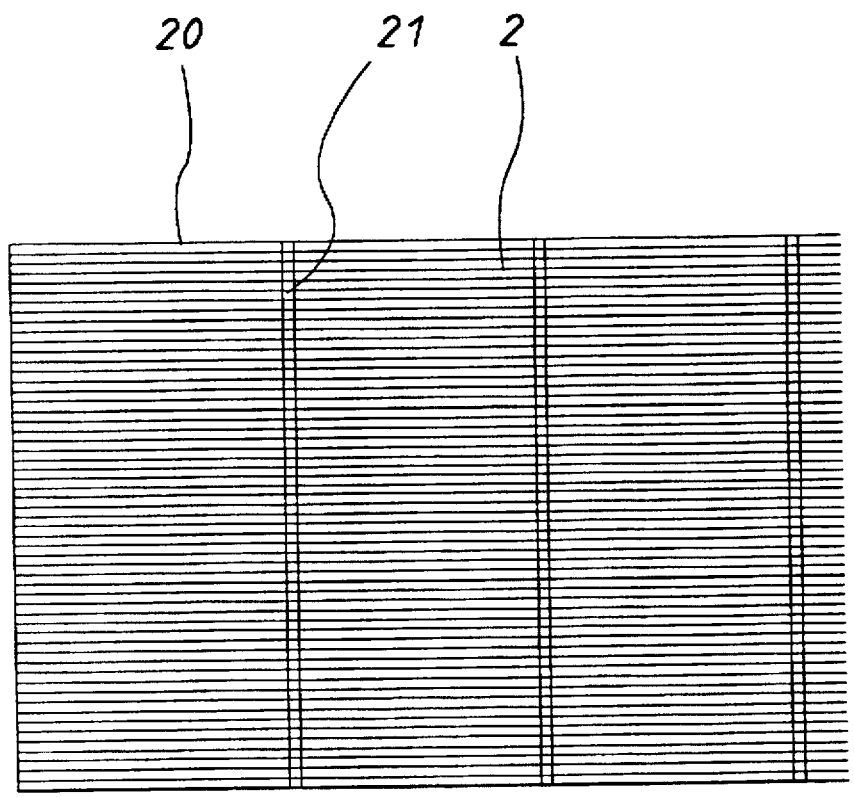
Figure 5A:
FIGS. 5a and 5b show an end view and an exploded end view respectively of the grate of FIGS. 4a and 4b.
Figure 5B:
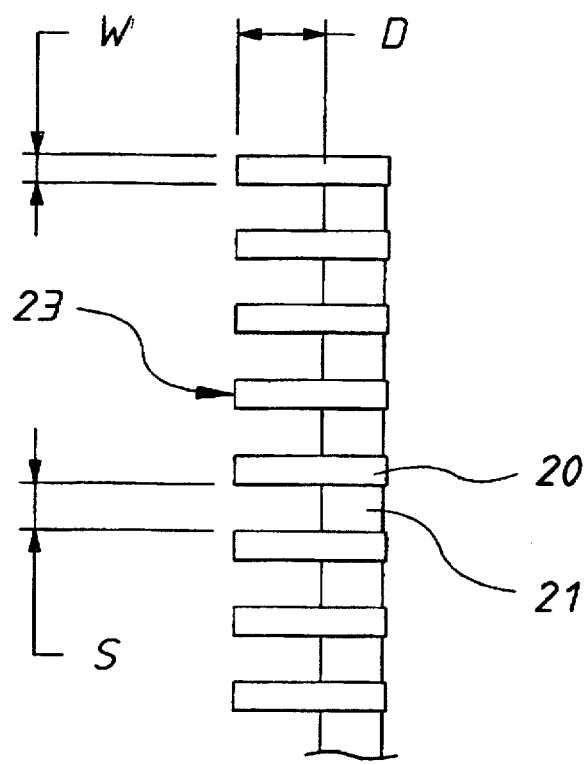
Figure 6:
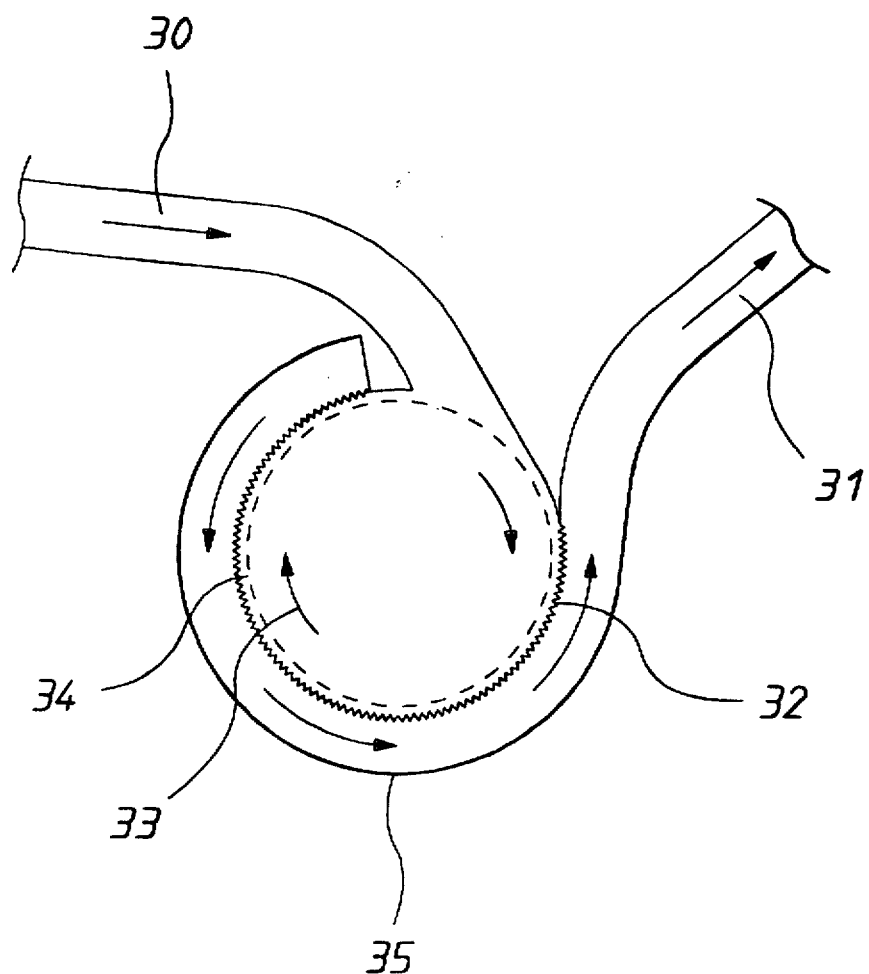
FIG. 6 is a plan view of a prior state of the art pollutant trap.

FIGS. 4a, 4b, 5a and 5b show a preferred embodiment of a grate (2) suitable for the filtering apparatus of FIGS. 1 to 3.

The grate (2) is formed from a plurality of beams (20), which are substantially rectangular in shape. The beams (20) are placed side by side, so that their top edges (23) are level with each other. The beams (20) are held in place by a plurality of cross-members (21).

As can be seen in FIG. 5, the cross-members (21) are fixed at a distance D below the top edges (23) of the beams (20), so as not to interfere with or catch onto any of the filtered rubbish as it slides down the grate (2). Preferably, the cross-members (21) are placed as far from the top edges (23) of the beams as is practical. The cross-members (21) are preferably sited, so as to present a smooth profile to any litter which might fall between the beams (20), thus further reducing the possibility of catching onto any of the filtered litter. It should be noted however, that the cross-members (21) are shown only as an example, and that any suitable method of supporting the grate beams (20), which does not interfere with the smooth upper surface of the grate (2), is within the scope of the invention.

The grate (2) is preferably made of steel. A distance S of approximately 15 mm between each adjacent beam (20) has been found to be particularly suitable for beams of a width W of about 10 mm, and for a grate inclined at an angle of α of about 18°–25° to the horizontal. It has been found, more generally, that a spacing S of approximately 1.5 times the width of the beam is suitable for a grate inclined at an angle of α of about 18°–25° to the horizontal.

The foregoing describes only one embodiment of the invention, and modifications, obvious to those skilled in the art, can be made thereto without departing from the scope of the invention.

The claims defining the present invention are as follows:

1. A filtering apparatus for filtering solid litter from a flow of water, said apparatus comprising;

an inclined filter grate having an upper end and a lower end, said grate including a plurality of generally parallel transversely spaced beams extending from said upper end to said lower end;

an inlet to receive the flow of water and direct the flow to said grate;

an outlet to receive filtered water that has passed through said grate;

catchment means at said lower end to collect litter; and wherein said inlet is configured to direct water leaving the inlet to flow in a direction substantially parallel to said beams, and said catchment means includes a collection surface located at said lower end positioned to collect litter, and access means enabling a cleaning vehicle or manual entry to the catchment means to remove litter from said collection surface.

2. The filtering apparatus of claim 1, wherein said filter grate is inclined at an angle of between 18° and 25° to the horizontal.

3. The filtering apparatus of claim 2 wherein said beams each have a flat upper surface.

4. The filtering apparatus of claim 3 wherein the upper surfaces are arranged so that said grate has a generally flat top surface.

5. The filtering apparatus of claim 4, wherein spacing between adjacent beams is about 1.5 times the width of each beam.

6. The filtering apparatus of claim 1, wherein each beam is of a rectangular, "T" or "V" shape in transverse cross section.

7. The filtering apparatus of claim 1, wherein said outlet comprises a channel, a first section of said channel being located beneath said filter grate.

8. The filtering apparatus of claim 7, wherein said channel is inclined by about 5% to the horizontal, which inclination is a ratio of fall relative to the distance between which the water enters and leaves the apparatus.

9. The filtering apparatus of claim 1, wherein said inlet comprises:

an inlet aperture adapted to be connected to a stormnwater drain, pipe or canal.

10. The filtering apparatus of claim 9, wherein inlet includes an inlet aperture and flow direction means comprising a deflector plate located at a predetermined distance downstream from the inlet aperture, said deflector plate being adapted to direct said flow of water onto said inclined filter grate.

11. The filtering apparatus of claim 10, wherein said deflector plate is aligned with the upper end of the inclined filter grate to direct water onto said inclined filter grate.

12. The filtering apparatus of claim 11, wherein said deflector plate is generally upwardly extending at an angle of about 10° to the vertical.

13. The filtering apparatus of claim 1, wherein said catchment surface is inclined to the horizontal at an angle of about 1° so as to slope downwardly to said lower end.

14. The filtering apparatus of claim 13, wherein said catchment means includes an end wall and at least two converging side walls, which side walls converge downwardly.

15. The filtering apparatus of claim 14, wherein said end wall comprises an overflow grate or weir adapted to release water from said apparatus when said apparatus is flooded to a predetermined level.

16. The filtering apparatus of claim 14, wherein at least one of said side walls provides said access means and functions as an access ramp to provide vehicular or manual access to said collection surface.

* * * * *